US010024193B2

(12) United States Patent
Shapiro

(10) Patent No.: US 10,024,193 B2
(45) Date of Patent: Jul. 17, 2018

(54) PIN SUPPORTED CMC SHROUD

(71) Applicant: General Electric Company, Schenectady, NY (US)

(72) Inventor: Jason David Shapiro, Methuen, MA (US)

(73) Assignee: General Electric Company, Schenectady, NY (US)

(*) Notice: Subject to any disclaimer, the term of this patent is extended or adjusted under 35 U.S.C. 154(b) by 165 days.

(21) Appl. No.: 14/945,789

(22) Filed: Nov. 19, 2015

(65) Prior Publication Data

US 2017/0145860 A1 May 25, 2017

(51) Int. Cl.
| | |
|---|---|
| *F01D 11/08* | (2006.01) |
| *F01D 25/28* | (2006.01) |
| *F01D 25/00* | (2006.01) |
| *F04D 29/02* | (2006.01) |
| *B29C 70/34* | (2006.01) |
| *B29C 53/02* | (2006.01) |
| *B29C 70/54* | (2006.01) |

(Continued)

(52) U.S. Cl.
CPC .............. *F01D 25/28* (2013.01); *B29C 53/02* (2013.01); *B29C 70/342* (2013.01); *B29C 70/545* (2013.01); *F01D 11/08* (2013.01); *F01D 25/005* (2013.01); *F01D 25/246* (2013.01); *F04D 29/023* (2013.01); *F04D 29/545* (2013.01); *B29C 53/04* (2013.01); *B29C 70/12* (2013.01); *B29K 2105/12* (2013.01); *B29L 2031/7504* (2013.01); *F05D 2220/32* (2013.01); *F05D 2230/10* (2013.01); *F05D 2240/11* (2013.01); *F05D 2260/30* (2013.01); *F05D 2300/603* (2013.01); *F05D 2300/6033* (2013.01); *Y02T 50/672* (2013.01)

(58) Field of Classification Search
CPC ........ F01D 11/08; F01D 25/28; F01D 25/246; B29C 53/02; B29C 53/22; B29C 53/34; F05D 2300/6033; F05D 2240/11
See application file for complete search history.

(56) References Cited

U.S. PATENT DOCUMENTS

| | | | |
|---|---|---|---|
| 7,726,936 B2 * | 6/2010 | Keller | ...................... F01D 11/12 415/173.4 |
| 2010/0150703 A1 * | 6/2010 | Gonzalez | .................. F01D 9/04 415/173.1 |

(Continued)

*Primary Examiner* — Woody Lee, Jr.
*Assistant Examiner* — Maxime Adjagbe
(74) *Attorney, Agent, or Firm* — General Electric Company; William Andes

(57) ABSTRACT

The present disclosure is directed to a component for a gas turbine. The component includes a component wall having a radially inner surface, a radially outer surface, a first circumferential surface, and a second circumferential surface. A first boss extends radially outwardly from the radially outer surface, includes a first circumferentially outer surface, and defines a first aperture extending axially therethrough. A second boss extends radially outwardly from the radially outer surface and is circumferentially spaced apart from the first boss. The second boss includes a second circumferentially outer surface and defines a second aperture extending axially therethrough. The first circumferentially outer surface of the first boss and the second circumferentially outer surface of the second boss form a pair of angles with respect to the radially inner surface.

16 Claims, 8 Drawing Sheets

(51) Int. Cl.
    *F04D 29/54*     (2006.01)
    *F01D 25/24*     (2006.01)
    *B29C 70/12*     (2006.01)
    *B29K 105/12*     (2006.01)
    *B29L 31/00*     (2006.01)
    *B29C 53/04*     (2006.01)

(56) References Cited

U.S. PATENT DOCUMENTS

2012/0055609 A1* 3/2012 Blanchard ............... B29C 70/24
    156/89.11
2013/0266431 A1* 10/2013 Moram .................. B29C 53/04
    415/182.1

* cited by examiner

PIN SUPPORTED CMC SHROUD

FIELD OF THE INVENTION

The present subject matter relates generally to a gas turbine engine. More particularly, the present subject matter relates to a composite shroud for a gas turbine engine.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the compressor section includes, in serial flow order, a high pressure (HP) compressor and a low pressure (LP) compressor. Similarly, the turbine section includes, in serial flow order, a high pressure (HP) turbine and a low pressure (LP) turbine. The HP compressor, LP compressor, HP turbine, and LP turbine include a one or more axially spaced apart rows of circumferentially spaced apart rotor blades. One or more shrouds may be positioned radially outward from and circumferentially enclose the rotor blades.

The one or more shrouds typically mount to the gas turbine engine via one or more mounting pins. Specifically, the one or more shrouds may include a plurality of bosses or flanges, each of which defines an aperture therethrough for receiving a mounting pin. Conventionally, the plurality of bosses is formed separately from the one or more shrouds, the aperture is formed in each boss via drilling, and each boss is coupled to the corresponding shroud. Nevertheless, this configuration limits the strength of the shroud and/or bosses. Accordingly, a shroud for a gas turbine that having increased strength, particularly in the regions that receive the mounting pins would be welcomed in the technology.

BRIEF DESCRIPTION OF THE INVENTION

Aspects and advantages of the invention will be set forth in part in the following description, or may be obvious from the description, or may be learned through practice of the invention.

The shroud for a gas turbine disclosed herein includes one or more bosses for receiving mounting pins that are integrally formed with a shroud wall. In this respect, the shroud disclosed herein has improved strength over conventional shrouds, particularly with respect to the bosses that receive the mounting pins.

In one aspect, the present disclosure is directed to a component for a gas turbine. The component includes a component wall having a radially inner surface, a radially outer surface, a first circumferential surface, and a second circumferential surface. A first boss extends radially outwardly from the radially outer surface, includes a first circumferentially outer surface, and defines a first aperture extending axially therethrough. A second boss extends radially outwardly from the radially outer surface and is circumferentially spaced apart from the first boss. The second boss includes a second circumferentially outer surface and defines a second aperture extending axially therethrough. The first circumferentially outer surface of the first boss and the second circumferentially outer surface of the second boss form a pair of angles with respect to the radially inner surface.

In another aspect, the present disclosure is directed to a gas turbine. The gas turbine includes a compressor, a combustion section, a turbine, and a shaft rotatably coupling the compressor and the turbine. A shroud is positioned in the turbine or the compressor. The shroud includes a shroud wall comprising a radially inner surface, a radially outer surface, a first circumferential surface, and a second circumferential surface. A first boss extends radially outwardly from the radially outer surface. The first boss includes a first circumferentially outer surface and defines a first aperture extending axially therethrough. A second boss extends radially outwardly from the radially outer surface and circumferentially spaced apart from the first boss. The second boss includes a second circumferentially outer surface and defines a second aperture extending axially therethrough. The first circumferentially outer surface of the first boss and the second circumferentially outer surface of the second boss form a pair of angles with respect to the radially inner surface.

In a further aspect, the present disclosure is directed to a method for fabricating a composite component for a gas turbine. The method includes laying a first plurality of composite plies in a mold. A second plurality of composite plies is laid over the first plurality of composite plies. A portion of the second plurality of composite plies is folded. The first plurality of composite plies and the second plurality of composite plies are cured. The first plurality of composite plies is machined after curing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
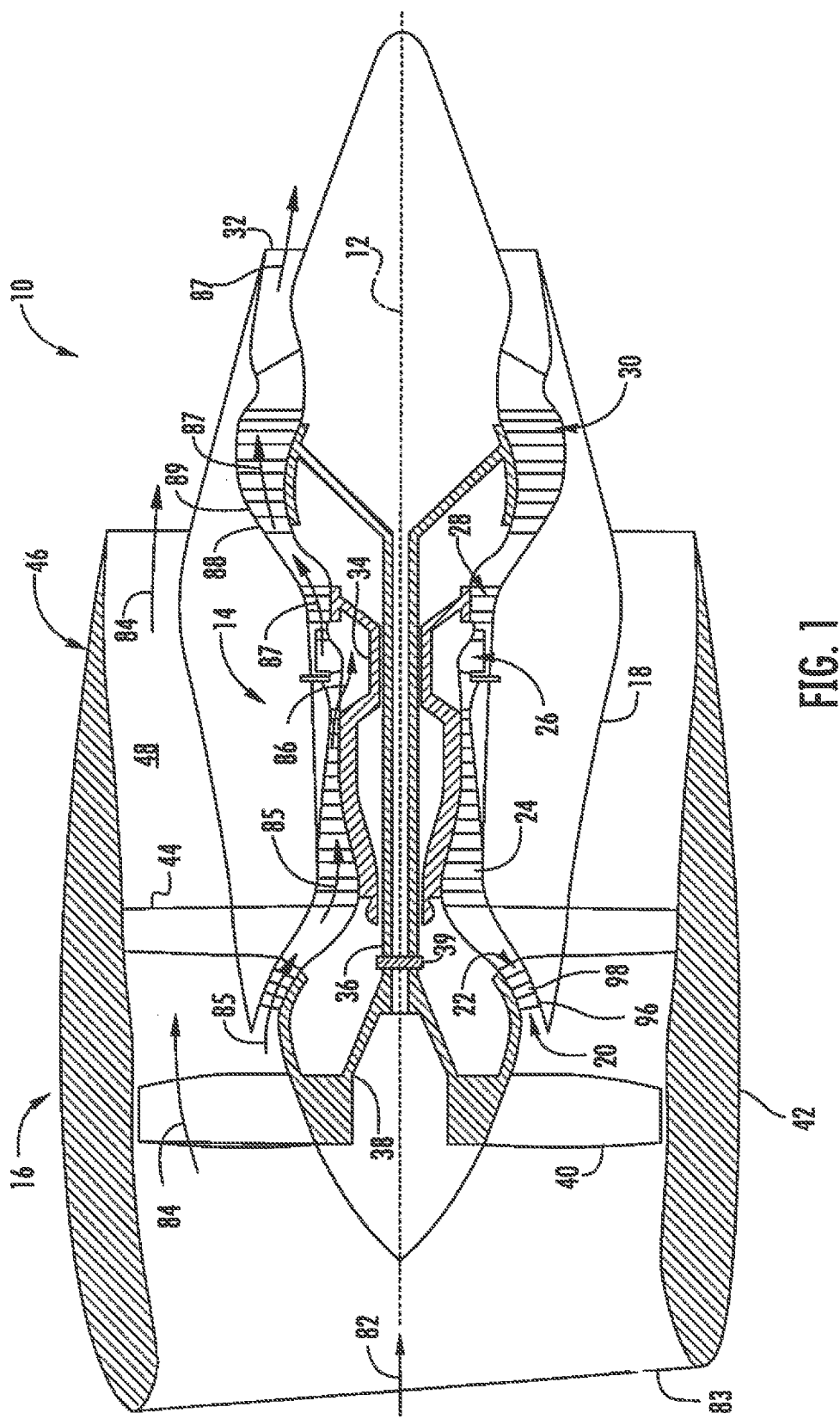
FIG. 1 is a schematic cross-sectional view of an exemplary high bypass turbofan jet engine in accordance with the embodiments disclosed herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Referring now to the drawings, wherein identical numerals indicate the same elements throughout the figures, FIG. 1 is a schematic cross-sectional view of an exemplary, high-bypass turbofan-type gas turbine engine 10 ("turbofan 10"), which may incorporate various embodiments disclosed herein. As shown in FIG. 1, the turbofan 10 has a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22 and a high pressure (HP) compressor 24, a combustion section 26, a turbine section having a high pressure (HP) turbine 28 and a low pressure (LP) turbine 30, and a jet exhaust nozzle section 32. A high pressure (HP) shaft or spool 34 drivingly couples the HP turbine 28 and the HP compressor 24. A low pressure (LP) shaft or spool 36 drivingly couples the LP turbine 30 and the LP compressor 22. The LP spool 36 may also couple to a fan spool or shaft 38 of the fan section 16. In some embodiments, the LP spool 36 may couple directly to the fan spool 38 (i.e., a direct-drive configuration). In other embodiments like the one shown in FIG. 1, the LP spool 36 may connect to the fan spool 38 via a reduction gear 39 (i.e., an indirect-drive or geared-drive configuration).

As shown in FIG. 1, the fan section 16 includes a plurality of fan blades 40 coupled to and extending radially outwardly from the fan spool 38. An annular fan casing or nacelle 42 circumferentially encloses the fan section 16 and/or at least a portion of the gas turbine engine 14. A plurality of circumferentially-spaced outlet guide vanes 44 may support the nacelle 42 relative to the gas turbine engine 14. Moreover, a downstream section 46 of the nacelle 42 may extend over an outer portion of the gas turbine engine 14 to define a bypass airflow passage 48 therebetween.

Figure 2:
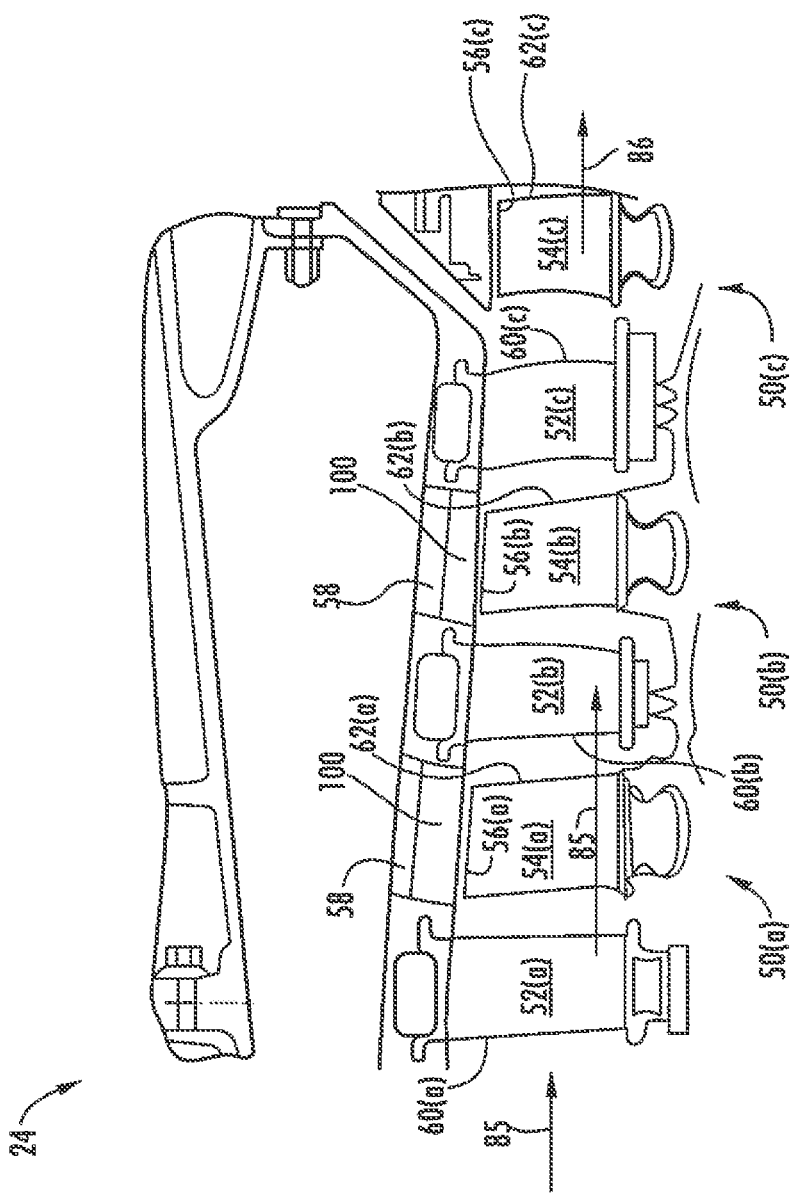
FIG. 2 is a cross-sectional side view of a high pressure compressor of the gas turbine engine shown in FIG. 1, illustrating the location of a shroud therein.

FIG. 2 is a cross-sectional side view of the HP compressor 24 shown in FIG. 1, which may incorporate various embodiments disclosed herein. As shown in FIG. 2, the HP compressor 24 may include three compressor stages 50. For example, the HP compressor 24 may include, in serial flow order, a first stage 50(a), a second stage 50(b), and a third stage 50(c). Although, the total number of compressor stages 50 may be more or less than three as is necessary or desired.

As shown in FIG. 2, each stage 50(a-c) includes corresponding rows 60(a), 60(b), 60(c) of circumferentially spaced apart compressor stator vanes 52(a), 52(b), and 52(c) and corresponding rows 62(a), 62(b), 62(c) of circumferentially spaced of compressor rotor blades 54(a), 54(b), and 54(c). The rows 60(a-c) of stator vanes 52(a-c) and the rows 62(a-c) of rotor blades 54(a-c) are axially spaced along the HP shaft 34 (FIG. 1). The rotor blades 54(a-c) couple to the HP shaft 34 and extend radially outwardly from the HP shaft 34 to corresponding blade tips 56(a), 56(b), and 56(c). The stator vanes 52(a-c) remain stationary relative to the rotor blades 54(a-c) during operation of the turbofan 10.

The HP compressor 24 may also include one or more shrouds 100 that couple to one or more compressor shroud mounts 58. The shrouds 100 are radially spaced from the blade tips 56(a-b) of the rotor blades 54(a-b) to form a clearance gaps therebetween. It is generally desirable to minimize the clearance gaps between the blade tips 56(a-b) and the shrouds 100, particularly during cruising operation of the turbofan 10, to reduce leakage over the blade tips 56(a-b) and through the clearance gaps.

Figure 3:
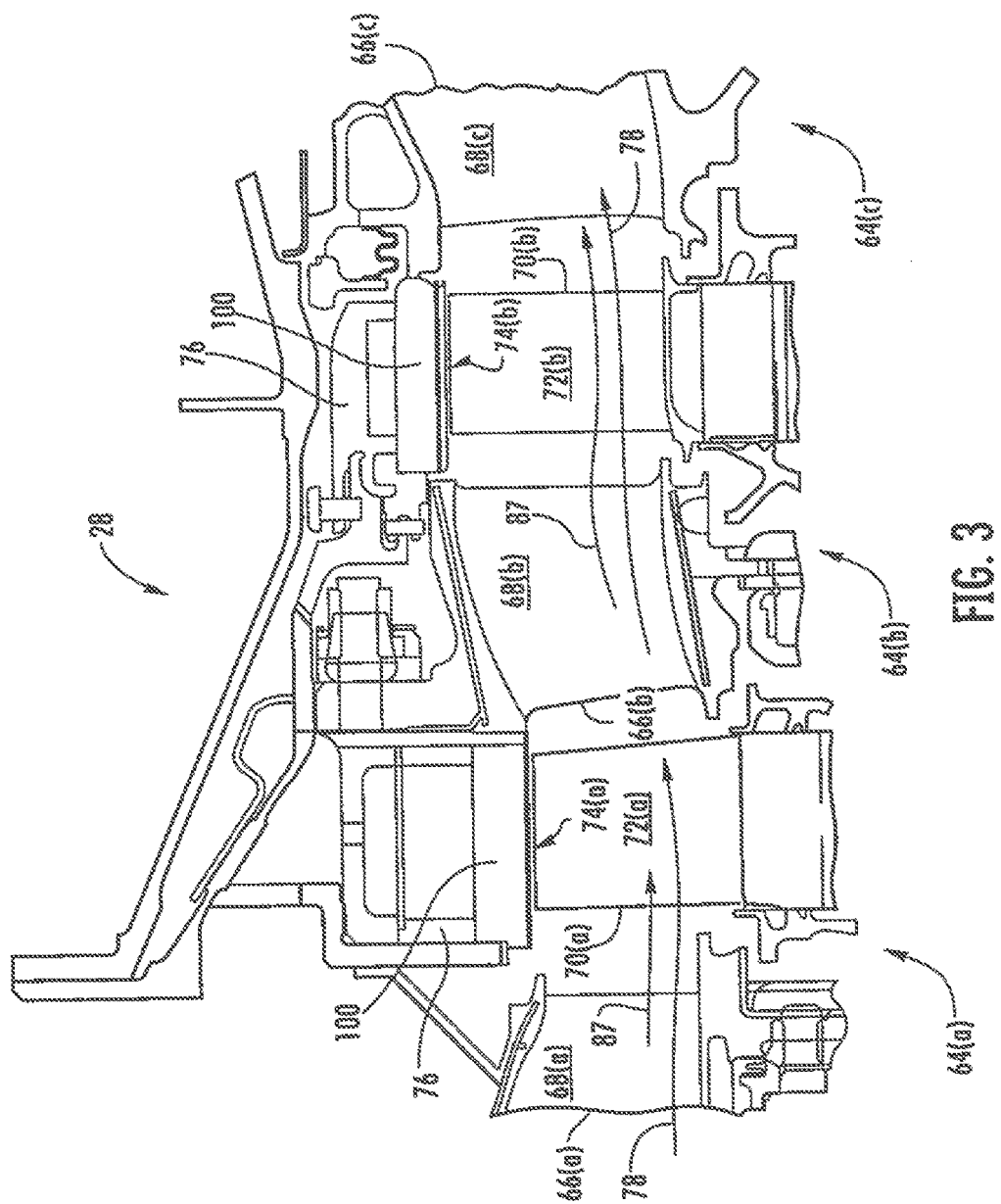
FIG. 3 is a cross-sectional side view of a high pressure turbine of the gas turbine engine shown in FIG. 1, illustrating the location of the shroud therein.

FIG. 3 is an enlarged cross-sectional side view of the HP turbine 26 shown in FIG. 1, which may incorporate various embodiments disclosed herein. As shown in FIG. 3, the HP turbine 26 may include three turbine stages 64. For example, the HP turbine 26 may include, in serial flow order, a first stage 64(a), a second stage 64(b), and a third stage 64(c). Although, the total number of turbine stages 64 may be more or less than three as is necessary or desired.

As shown in FIG. 3, each stage 64(a-c) includes corresponding rows 66(a), 66(b), 66(c) of circumferentially spaced apart turbine stator vanes 68(a), 68(b), and 68(c) and corresponding rows 70(a) and 70(b) of circumferentially spaced of turbine rotor blades 72(a) and 72(b). The rows 66(a-c) of stator vanes 52(a-c) and the rows 70(a-b) of rotor blades 72(a-b) are axially spaced along the HP shaft 34 (FIG. 1). Although not shown in FIG. 3, the third stage 64(c) may include a row of rotor blades. The rotor blades 72(a-b) couple to the HP shaft 34 and extend radially outwardly from the HP shaft 34 to a corresponding blade tip 74(a) and 74(b). The stator vanes 68(a-c) remain stationary relative to the rotor blades 72(a-b) during operation of the turbofan 10. In this respect, the stator vanes 68(a-c) and the rotor blades 72(*a-c*) at least partially define a hot gas path 78 for routing combustion gases from the combustion section 26 (FIG. 1) through the HP turbine 28.

The HP turbine 24 may also include one or more shrouds 100 that couple to one or more turbine shroud mounts 76. The shrouds 100 are radially spaced from the blade tips 74(*a-b*) of the rotor blades 72(*a-b*) to form a clearance gaps therebetween. It is generally desirable to minimize the clearance gaps between the blade tips 74(*a-b*) and the shrouds 100 to reduce leakage from the hot gas path 78 over the blade tips 74(*a-b*) and through the clearance gaps.

As illustrated in FIG. 1, air 82 enters an inlet portion 83 of the turbofan 10 during operation thereof. A first portion 84 of the air 82 flows into the bypass flow passage 48, and a second portion 85 of the air 82 flows into the inlet 20 of the LP compressor 22.

The second portion 85 of the air 82 flows through LP compressor 22 where sequential stages of LP compressor stator vanes 96 and LP compressor rotor blades 98 coupled to the LP shaft 36 progressively compress the second portion 85 of air 82 flowing therethrough en route to the HP compressor 24. The stator vanes 52(*a-c*) and turbine rotor blades 54(*a-c*) in the HP compressor 24 further compress the second portion 85 of the air 82 flowing therethrough. In this respect, HP turbine 24 provides compressed air 86 to the combustion section 26 where it mixes with fuel and burns to provide combustion gases 87.

The combustion gases 87 flow through the HP turbine 28 where the stator vanes 68(*a-c*) and turbine rotor blades 72(*a-b*) extract a first portion of kinetic and/or thermal energy from the combustion gases 87. This energy extraction supports operation of the HP compressor 24. The combustion gases 87 then flow through the LP turbine 30 where sequential stages of LP turbine stator vanes 88 and LP turbine rotor blades 89 coupled to the LP shaft 36 extract a second portion of thermal and kinetic energy from the combustion gases 87. This energy extraction causes the LP shaft 36 to rotate, thereby supporting operation of the LP compressor 22 and/or rotation of the fan spool or shaft 38. The combustion gases 87 then exit the gas turbine engine 14 via the jet exhaust nozzle section 32.

Along with a turbofan 10, a core turbine 14 serves a similar purpose and sees a similar environment in land-based gas turbines, turbojet engines in which the ratio of the first portion of air 84 to the second portion of air 85 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP spool 36 and the fan shaft 38 of the fan section 16.

Multiple embodiments of the shroud 100 will be described below as positioned adjacent to the row 70(*a*) of turbine rotor blades 72(*a*) in the HP turbine 28. Nevertheless, the various embodiments of the shroud 100 may be positioned adjacent to any row of turbine rotor blades in the HP turbine 28. Furthermore, the various embodiments of the shroud 100 may also be positioned the LP turbine 30, the LP compressor 22, and/or the HP compressor 24.

Figure 4:
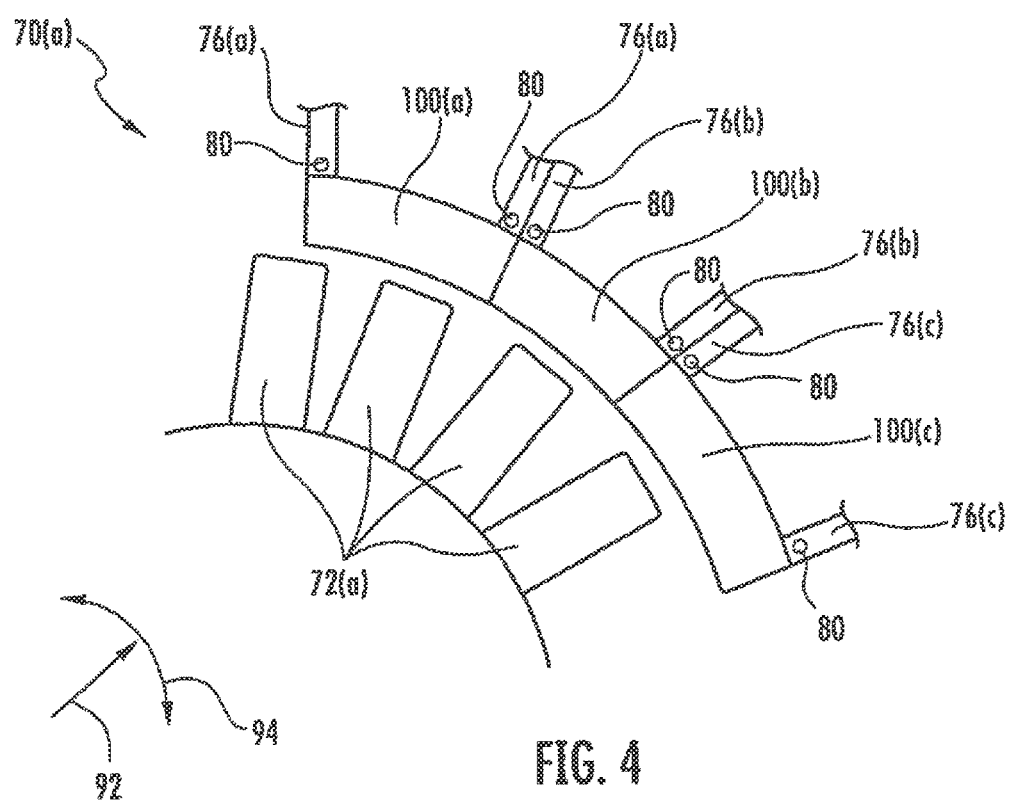
FIG. 4 is a front view of a portion of one row of turbine rotor blades in the high pressure turbine shown in FIG. 3, illustrating a plurality of shrouds circumferentially enclosing the portion of the row of turbine rotor blades.
Figure 5:
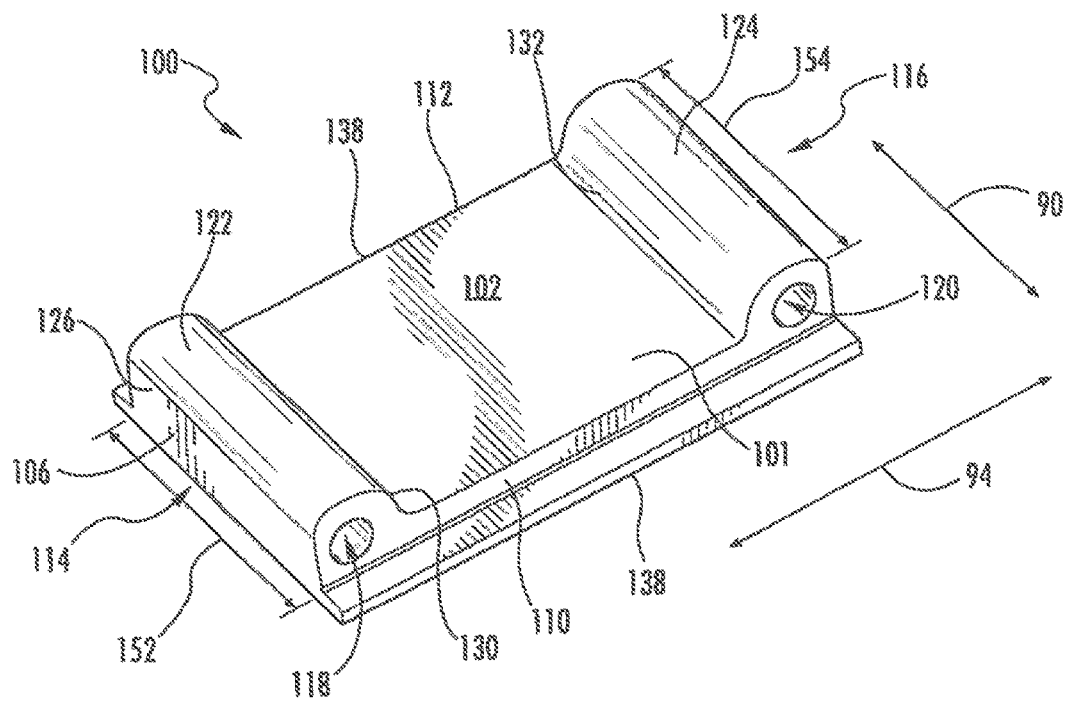
FIG. 5 is a perspective view of one embodiment of the shroud as disclosed herein.
Figure 6:
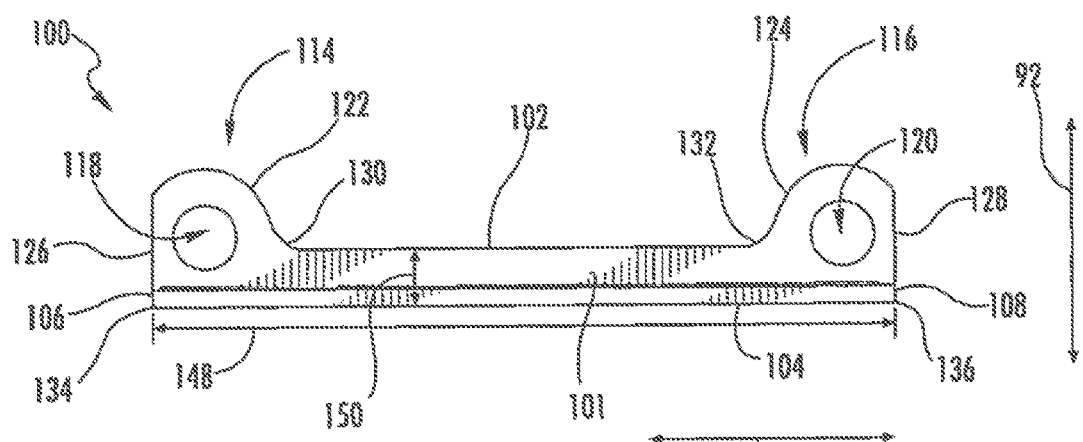
FIG. 6 is a front view of the embodiment of the shroud shown in FIG. 5, further illustrating the features thereof.

FIGS. 4-6 illustrate one embodiment of the shroud 100. More specifically, FIG. 4 is a front view of a portion of the row 70(*a*) of turbine rotor blades 72(*a*), illustrating a plurality of shrouds 100 circumferentially enclosing the portion of the row 70(*a*) of turbine rotor blades 72(*a*). FIG. 5 is a perspective view of the shroud 100, illustrating the various features thereof. FIG. 6 is a front view of the shroud 100, further illustrating the features thereof.

As illustrated in FIGS. 4-6, the shroud 100 defines an axial direction 90, a radial direction 92, and a circumferential direction 94. In general, the axial direction 90 extends along the longitudinal axis 12, the radial direction 92 extends orthogonally outward from the longitudinal axis 12, and the circumferential direction 94 extends concentrically around the longitudinal axis 12.

FIG. 4 illustrates a plurality of the shrouds 100(*a*), 100(*b*), 100(*c*) circumferentially enclosing the row 70(*a*) of turbine rotor blades 72(*a*) in the HP turbine 28. Although only a ninety degree portion of the row 70(*a*) is shown for clarity, additional shrouds 100 may circumferentially enclose the remaining 270 degrees of the row 70(*a*) as well. As illustrated in FIG. 4, the shrouds 100 are axially aligned and positioned every thirty degrees (i.e., three shrouds 100(*a-c*) in a ninety degrees portion of the row 70(*a*)). In this respect, the twelve shrouds 100 may circumferentially enclose the row 70(*a*); although, more or less shrouds 100 may enclose the row 70(*a*) as is necessary or desired. Each of the shrouds 100(*a-c*) couples to a respective turbine shroud mount 76(*a*), 76(*b*), and 76(*c*) via one or more mounting pins 80.

As illustrated in FIGS. 5-6, the shroud 100 includes a shroud wall 101 having a radially outer surface 102 and a radially inner surface 104 radially spaced apart from the radially outer surface 102 by a radial thickness 150. The shroud wall 101 also includes a first circumferential surface 106 and a second circumferential surface 108 circumferentially spaced apart from the first circumferential surface 106 by a circumferential length 148. Furthermore, the shroud wall 101 includes a first axial surface 110 and a second axial surface 112 axially spaced apart from the first axial surface 110 by an axial length 152. In this respect, the circumferential length 148 is preferably longer than the axial length 152 as illustrated in FIG. 5; although, the axial length 152 may be longer or the same as the circumferential length 148. The circumferential length 148 and the axial length 152 are preferably longer than the radial thickness 150, but be shorter or the same as well. The shroud wall 101 may curved or planar (i.e., straight) in the circumferential direction 94. Furthermore, the shroud wall 101 may optionally include a pair of axially opposed flanges extending axially outwardly from the first and the second axial surfaces 110, 112.

The shroud 100 also includes a first boss 114 and second boss 116 integrally formed with the shroud wall 101 as will be discussed in greater detail below. The first and the second bosses 114, 116 are circumferentially spaced apart and extend radially outwardly from the radially outer surface 102. As illustrated in FIG. 5, the first and the second bosses 114, 116 may extend axially between the first and the second axial surfaces 110, 112. That is, the first and the second bosses 114, 116 have an axial length 154 that is the same as the axial length 152 of the shroud wall 101. Although, the axial length 154 of the first and the second bosses 114, 116 may be longer or shorter than the axial length 152 of the shroud wall 101. Furthermore, the first and the second bosses 114, 116 may have different axial lengths.

The first boss 114 defines a first aperture 118 extending axially therethrough, and the second boss 116 defines a second aperture 120 extending axially therethrough. The first and the second apertures 118, 120 have the same length as the axial length 154 of the first and the second bosses 114, 116. The first and the second apertures 118, 120 should be sized and shaped to receive the corresponding mounting pin 80, which couples the shroud 100 to the turbine shroud mount 76(*a*) as illustrated in FIGS. 3-4. In the embodiment illustrated in FIGS. 5-6, the first and the second apertures 118, 120 may have a circular cross-section. Although, the first and the second apertures 118, 120 may have any suitable cross-sectional shape (e.g., rectangular) as well.

As best illustrated in FIG. 6, the first boss 114 includes a first circumferentially inner surface 122, and the second boss 114 includes a second circumferentially inner surface 124. The first and the second circumferentially inner surfaces 122, 124 may have a convex shape and be positioned over the radially outer and circumferentially inner portions of the first and the second bosses 114, 116. Although, the first and the second circumferentially inner surfaces 122, 124 may be flat or concave. Furthermore, multiple discrete surfaces (not shown) may be positioned over the radially outer and circumferentially inner portions of the first and the second bosses 114, 116. Preferably, a first fillet or chamfer 130 transitions between the first circumferentially inner surface 122 of the first boss 114 and the radially outer surface 102 of the shroud wall 101. Similarly, a second fillet or chamfer 132 preferably transitions between the second circumferentially inner surface 124 of the second boss 116 and the radially outer surface 102 of the shroud wall 101.

The first boss 114 also includes a first circumferentially outer surface 126, and the second boss 114 includes a second circumferentially outer surface 128. The first and the second circumferentially outer surfaces 126, 128 may be planar. In the embodiment shown in FIGS. 5-6, the first and the second circumferentially outer surfaces 126, 128 are circumferentially aligned with the first and the second circumferential surfaces 106, 108 of the shroud wall 101. In this respect, the first circumferentially outer surface 126 of the first boss 114 and the first circumferential surface 106 of the shroud wall 101 form a continuous surface. Similarly, the second circumferentially outer surface 128 of the second boss 116 and the second circumferential surface 108 of the shroud wall 101 form a continuous surface. Although, the first and the second circumferentially outer surfaces 126, 128 may be circumferentially spaced apart from the first and the second circumferential surfaces 106, 108 of the shroud wall 101 as discussed in greater detail below. In some embodiments, the first and the second circumferentially outer surfaces 126, 128 may be perpendicularly oriented with respect to the radially inner surface 104. As such, the first and the second circumferentially outer surfaces 126, 128 respectively form a first angle 134 and a second angle 136 with the radially inner surface 104. In some embodiments, the first and the second angles 134, 136 may be right angles.

The shroud 100 is preferably constructed from a composite material such as a ceramic matrix composite. Nevertheless, the shroud 100 may be a suitable non-composite material as well.

Figure 7:
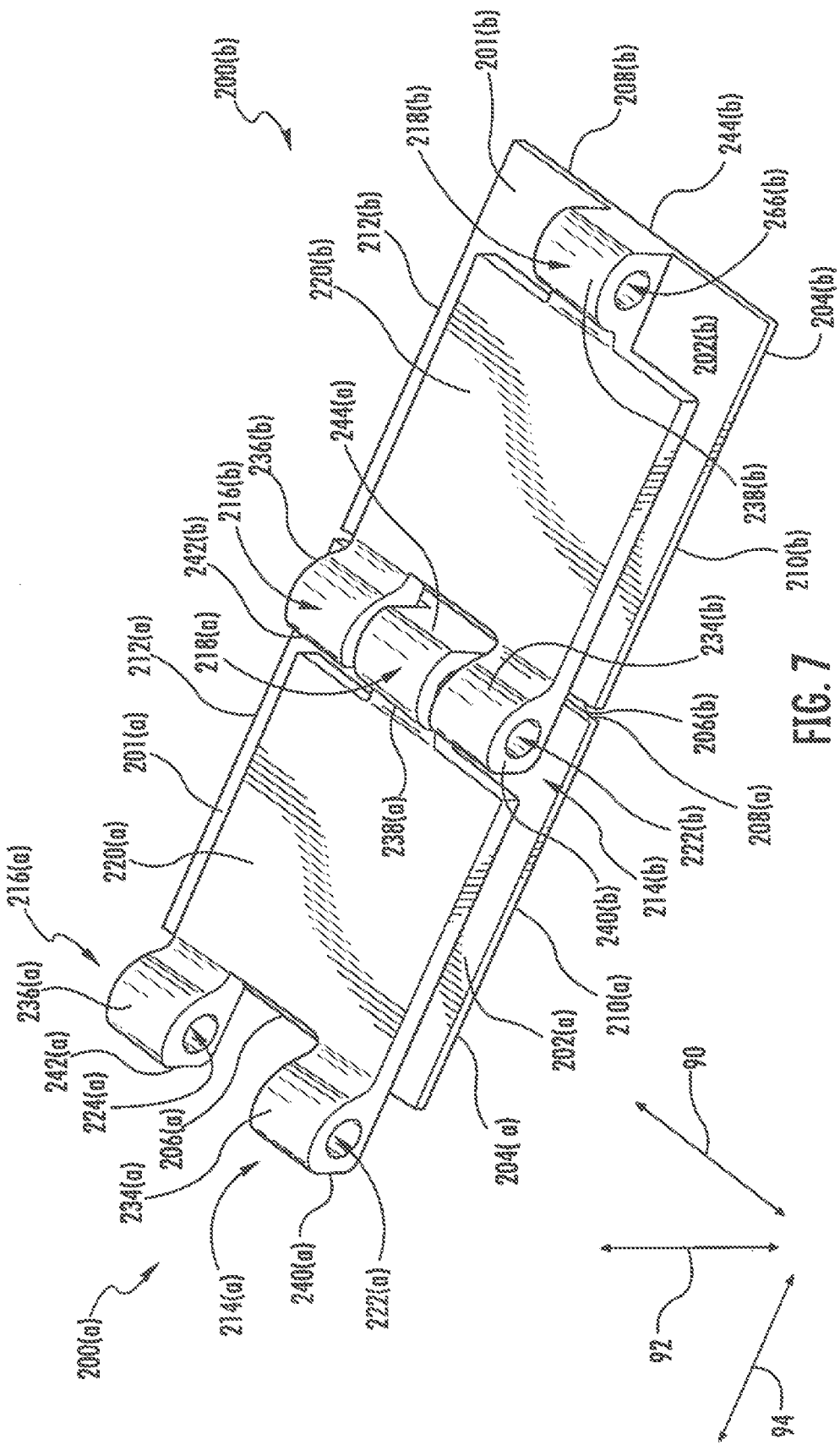
FIG. 7 is a perspective view of an alternate embodiment of the shroud as disclosed herein.

FIG. 7 illustrates an alternate embodiment of the shroud 200. In particular, FIG. 7 shows a first shroud 200(a) positioned circumferentially adjacent to a second shroud 200(b). The first and the second shrouds 200(a), 200(b) may couple via the mounting pin 80 (FIG. 4). Furthermore, the mounting pin 80 may couple the first and the second shrouds 200(a), 200(b) to one or turbine shroud mounts 76 (FIG. 4).

As illustrated in FIG. 7, the shroud 200(a) includes a shroud wall 201(a) having a radially outer surface 202(a) and a radially inner surface 204(a). The shroud wall 201(a) also includes a first circumferential surface 206(a) and a second circumferential surface 208(a) circumferentially spaced apart from the first circumferential surface 206(a). Furthermore, the shroud wall 201(a) includes a first axial surface 210(a) and a second axial surface 212(a) axially spaced apart from the first axial surface 210(a). The shroud wall 201(a) may be curved or planar (i.e., straight) in the circumferential direction 94.

In a similar manner, the shroud 200(b) includes a shroud wall 201(b) having a radially outer surface 202(b) and a radially inner surface 204(b). The shroud wall 201(b) also includes a first circumferential surface 206(b) and a second circumferential surface 208(b) circumferentially spaced apart from the first circumferential surface 206(b). Furthermore, the shroud wall 201(b) includes a first axial surface 210(b) and a second axial surface 212(b) axially spaced apart from the first axial surface 210(b). The shroud wall 201(b) may be curved or planar (i.e., straight) in the circumferential direction 94.

The first shroud 200(a) includes a first boss 214(a), second boss 216(a), and a third boss 218(a) integrally formed with the shroud wall 201(a) and extending radially outwardly from the radially outer surface 202(a). The first boss 214(a) is circumferentially aligned with the second boss 216(a), and the first and the second bosses 214(a), 216(a) are circumferentially spaced apart from the third boss 218(a).

Similarly, the second shroud 200(b) includes a first boss 214(b), second boss 216(b), and a third boss 218(b) integrally formed with the shroud wall 201(b) and extending radially outwardly from the radially outer surface 202(b). The first boss 214(b) is circumferentially aligned with the second boss 216(b), and the first and the second bosses 214(b), 216(b) are circumferentially spaced apart from the third boss 218(b)

With respect to the first shroud 202(a), the first boss 214(a), the second boss 216(a), and the third boss 218(a) respectively define a first aperture 222(a), a second aperture 224(a), and a third aperture (not shown) extending axially therethrough. With respect to the second shroud 202(b), the first boss 214(b), the second boss 216(b), and the third boss 218(b) respectively define a first aperture 222(b), a second aperture (not shown), and a third aperture 226(b) extending axially therethrough. The first and the second apertures 222(a), 224(a) in the first shroud 200(a) are coaxial, and the first aperture 222(b) and the second aperture (not shown) in the second shroud 200(b) are coaxial. The first aperture 222(a), the second aperture 224(a), and the third aperture (not shown) of the first shroud 200(a) as well as the first aperture 222(b), the second aperture (not shown), and the third aperture 226(b) of the second shroud 200(b) should be sized and shaped to receive the corresponding mounting pin 80.

The first boss 214(a), the second boss 216(a), and the third boss 218(a) respectively include a first circumferentially inner surface 234(a), a second circumferentially inner surface 236(a), and a third circumferentially inner surface 238(a). Similarly, the second boss 214(b), the second boss 216(b), and the third boss 218(b) respectively include a first circumferentially inner surface 234(b), a second circumferentially inner surface 236(b), and a third circumferentially inner surface 238(b). The circumferentially inner surfaces 234(a), 236(a), 238(a), 234(b), 236(b), 238(b) may have a convex shape and be positioned over the radially outer and circumferentially inner portions of the bosses 214(a-b), 216(a-b), 218(a-b).

The first boss 214(a), the second boss 216(a), and the third boss 218(a) also respectively include a first circumferentially outer surface 240(a), a second circumferentially outer surface 242(a), and a third circumferentially outer surface 244(a). Similarly, the first boss 214(b), the second boss 216(b), and the third boss 218(b) respectively include a first circumferentially outer surface 240(*b*), a second circumferentially outer surface 242(*b*), and a third circumferentially outer surface 244(*b*). The circumferentially outer surfaces 240(*a-b*), 242(*a-b*), 244(*a-b*) may be planar. In the embodiment shown in FIG. 7, the first and the second circumferentially outer surfaces 240(*a*), 242(*a*) are circumferentially spaced apart from the first circumferential surface 206(*a*) of the first shroud 200(*a*), and the first and the second circumferentially outer surfaces 240(*b*), 242(*b*) are circumferentially spaced apart from the first circumferential surface 206(*b*) of the second shroud 200(*b*). The third circumferentially outer surface 244(*a*) is circumferentially aligned with the second circumferential surface 208(*a*) of the first shroud 200(*a*), and the third circumferentially outer surface 244(*b*) is circumferentially aligned with the second circumferential surface 208(*b*) of the second shroud 200(*b*). Furthermore, the circumferentially outer surfaces 240(*a*), 242(*a*), 244(*a*) are perpendicularly oriented with respect to the radially inner surface 204(*a*) of the first shroud 200(*a*), and the circumferentially outer surfaces 240(*b*), 242(*b*), 244(*b*) are perpendicularly oriented with respect to the radially inner surface 204(*b*) of the second shroud 200(*b*).

The first shroud 200(*a*) may include a first support boss 220(*a*), and the second shroud 200(*b*) may include a second support boss 220(*b*). The support bosses 220(*a-b*) respectively extend radially outwardly from the radially outer surfaces 202(*a-b*). The support bosses 220(*a-b*) provide additional rigidity to the first and the second shrouds 200(*a-b*). The support bosses 220(*a-b*) should provide clearance for the first and the second bosses of the adjacent shroud as will be discussed in greater detail below. In some embodiments, the first, the second, and the third bosses 214(*a-b*), 216(*a-b*), 218(*a-b*) may be integrally formed with the support bosses 220(*a-b*).

FIG. 7 shows the relative positioning of two adjacent shrouds, namely the first shroud 200(*a*) and the second shroud 200(*b*). More specifically, the first shroud 200(*a*) is axially aligned with and circumferentially adjacent to the second shroud 200(*b*). The first and the second bosses 214(*b*), 216(*b*) of the second shroud 200(*b*) are circumferentially aligned with the third boss 218(*a*) of the first shroud 200(*a*). In particular, the first aperture 222(*b*) and the second aperture (not shown) of the second shroud 200(*b*) are coaxial with the third aperture (not shown) of the first shroud 200(*a*). In this respect, the first aperture 222(*b*), the second aperture of the second shroud (not shown), and the third aperture of the first shroud (not shown) may receive the corresponding mounting pin 80. The first and the second circumferentially outer surfaces 240(*b*), 242(*b*) of the first and the second bosses 214(*b*), 216(*b*) of the second shroud 200(*b*) are positioned circumferentially between first circumferential surface 206(*a*) and the second circumferential surface 208(*a*) of the first shroud 200(*a*). Furthermore, the third circumferentially outer surface 244(*a*) of the third boss 218(*a*) of the first shroud 200(*a*) is positioned circumferentially between the first and the second circumferentially outer surfaces 240(*b*), 242(*b*) of the first and the second bosses 214(*b*), 216(*b*) of the second shroud 200(*b*) and the first circumferential surface 206(*b*) of the second shroud 200(*b*). As such, a portion of the first and the second bosses 214(*b*), 216(*b*) of the second shroud wall 200(*b*) circumferentially overlaps a portion of the shroud wall 201(*a*) of the first shroud 200(*a*).

Figure 8:
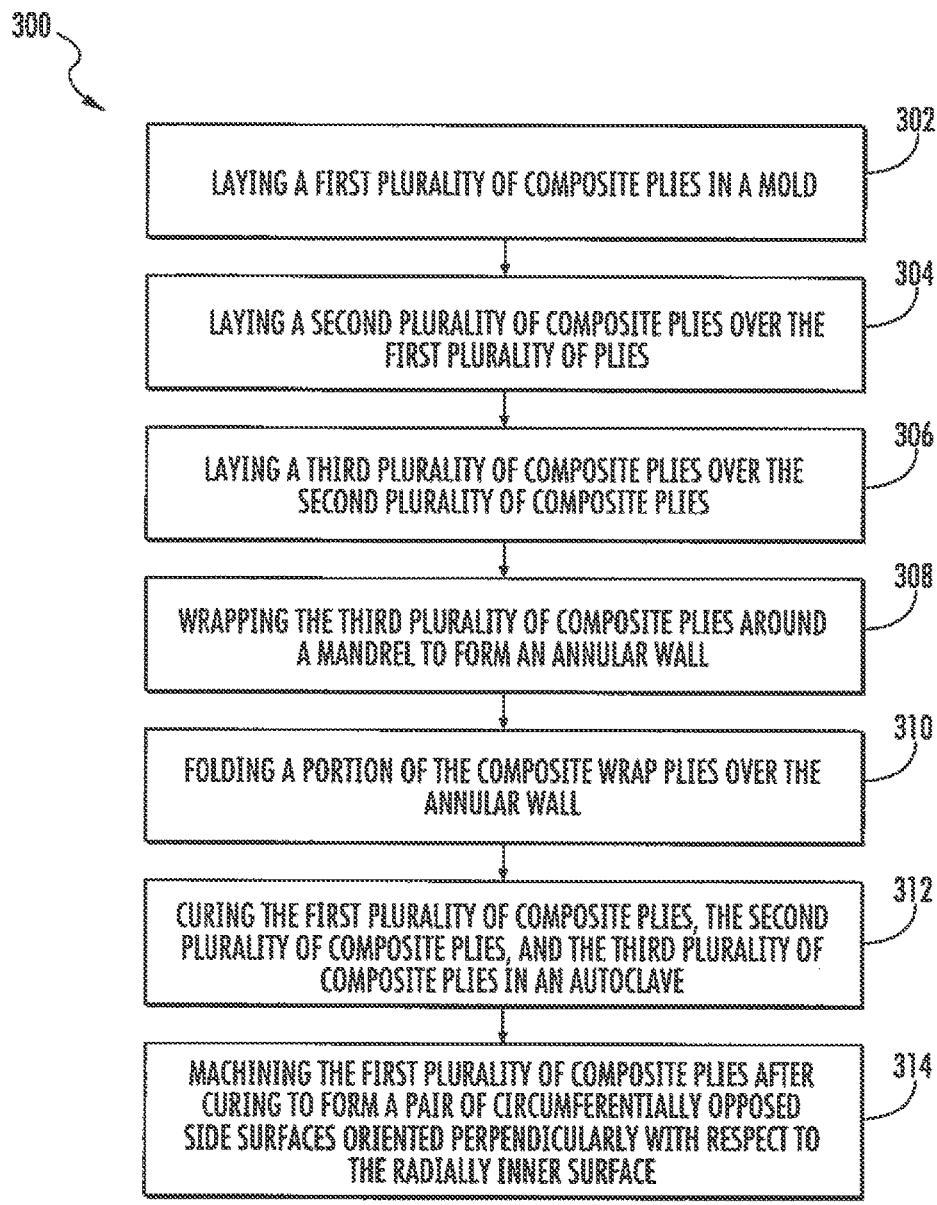
FIG. 8 is a flow chart illustrating one method for constructing the shroud in accordance with the embodiments disclosed herein.
Figure 9:
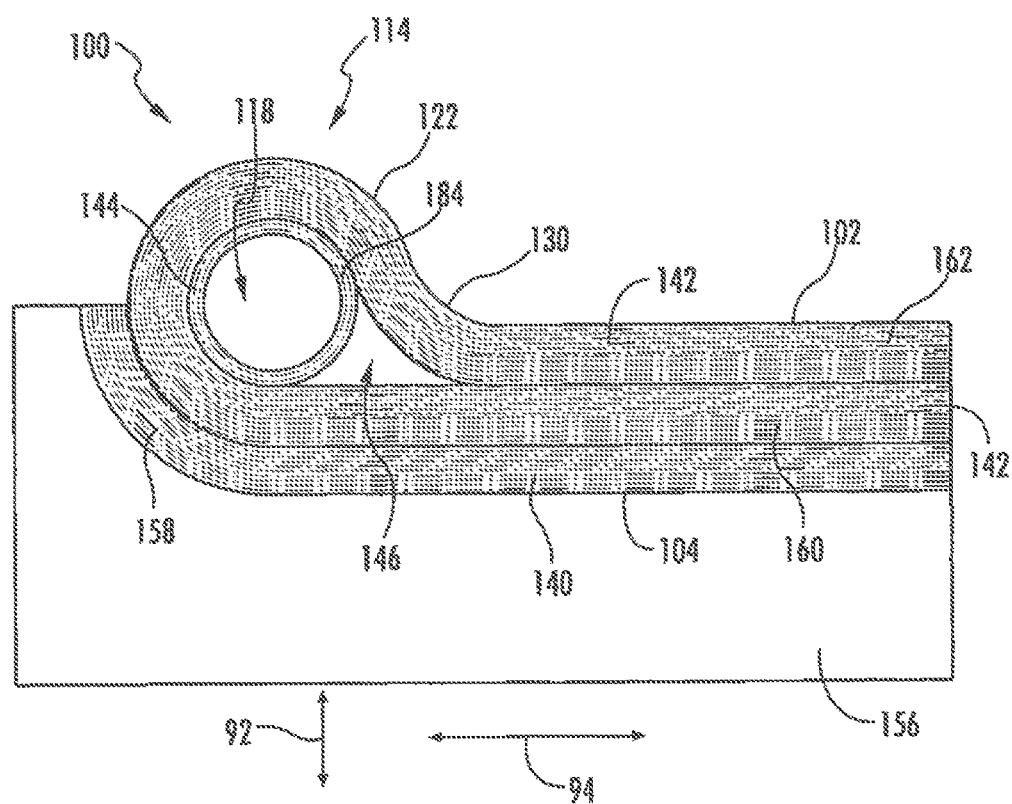
FIG. 9 is a cross-sectional view of a portion of the shroud after forming and before curing.

FIGS. 8-9 illustrate a method (300) for forming the shrouds 100, 200 in accordance with the embodiments disclosed herein. In particular, FIG. 8 is a flow chart illustrating the method (300), and FIG. 9 is a cross-sectional view of the shroud 100 after forming and before curing.

The method (300) is described below in the context of the shroud 100 and, more particularly, the portion thereof adjacent to the first boss 114. Nevertheless, the method (300) may be used to form the second boss 116 of the first shroud 100 or and boss of the shrouds 200(*a*), 200(*b*). Furthermore, the method (300) may be used to make other composite components such as segmented ducts or spacer components.

In step (302), a first plurality of composite plies 140 is laid in a mold 156. A portion 158 of the first plurality of plies 140 curves radially outward to form a portion of the first boss 114. Preferably, each of the first plurality of plies 140 is arranged such that each alternates in orientation by forty-five degrees or ninety degrees. Although, each of the first plurality of plies 140 may alternate by a different angle or not alternate at all.

A second plurality of composite plies 142 is laid over the first plurality of plies 140 in step (304). The second plurality of composite plies 142 includes a first portion 160, which contacts the first plurality of composite plies 140, and a second portion 162, which extends past the portion 158 of the first plurality of plies 140. As will be discussed in greater detail below, the second portion 162 of the second plurality of plies 142 is folded back over the first portion 160 of the second plurality of plies 142. Preferably, each of the second plurality of composite plies 142 is arranged such that each alternates in orientation by forty-five degrees or ninety degrees. Although, each of the second plurality of plies 142 may alternate by a different angle or not alternate at all.

In step (306), a third plurality of composite plies 144 is wrapped around a mandrel (not show) to form an annular wall 184 as illustrated in FIG. 9. The annular wall 184 defines the first aperture 118 and retains the corresponding mounting pin 80. The third plurality of composite plies 144 is laid over the first portion 160 of the second plurality of composite plies 142 in step (308).

In step (310), the second portion 162 of the second plurality of composite plies 142 is folded over the annular wall 184. As such, the second plurality of composite plies 142 wrap around the circumference of the annular wall 184, thereby forming the first boss 114. The second portion 162 of the second plurality of composite plies 142 is positioned on top of the first portion 160 of the second plurality of composite plies 142. In this respect, the second portion 162 of the second plurality of composite plies 142 forms the radially outer surface 102. FIG. 9 illustrates a portion of the shroud 100 after step (310). The first plurality, the second plurality, and the third plurality of composite plies 140, 142, 144 are cured in an autoclave (not shown) in step (312).

In step (314), the portion 158 of the first plurality of composite plies 140 is machined to form the first and the second circumferentially outer surfaces 126, 128 of the first and the second bosses 114, 116. More particularly, the portion 158 of the first plurality of composite plies 140 is machined (e.g., via milling, grinding, etc.) to create the angles 134, 136 with respect to the radially inner surface 104 (i.e., the first and the second circumferentially outer surfaces 126, 128). Step (314) occurs after step (312).

Method (300) may also include additional steps. For example, the method (300) may include inserting a composite filler structure or member or other composite member 146 into a cavity (not shown) collectively formed by the first portion 160 of the second plurality of composite plies 142, the second portion 162 of the second plurality of composite plies 142, and the third plurality of plies 144. The composite filler structure 146 is formed from chopped and/or other short fibers and fills gaps or other voids between adjacent composite plies fills (e.g., the aforementioned cavity), thereby strengthening the shroud 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A component for a gas turbine, comprising:
   a component wall comprising a radially inner surface, a radially outer surface, a first circumferential surface, and a second circumferential surface;
   a first boss extending radially outwardly from the radially outer surface, wherein the first boss comprises a first circumferentially outer surface and defines a first aperture extending axially therethrough; and
   a second boss extending radially outwardly from the radially outer surface and circumferentially spaced apart from the first boss, wherein the second boss comprises a second circumferentially outer surface and defines a second aperture extending axially therethrough,
   wherein the first circumferentially outer surface of the first boss is circumferentially aligned and parallel to the first circumferential surface of the component wall to form a first continuous surface and the second circumferentially outer surface of the second boss is circumferentially aligned and parallel to the second circumferential surface of the component wall to form a second continuous surface;
   wherein the component is a shroud.

2. The component of claim 1, wherein the component wall, the first boss, and the second boss are constructed from a composite.

3. The component of claim 1, wherein the first circumferentially outer surface and the second circumferentially outer surface are planar.

4. The component of claim 1, further comprising:
   a fillet that couples the radially outer surface to a circumferentially inner surface of the first boss or the second boss.

5. A component for a gas turbine, comprising:
   a component wall comprising a radially inner surface, a radially outer surface, a first circumferential surface, and a second circumferential surface;
   a first boss extending radially outwardly from the radially outer surface, wherein the first boss comprises a first circumferentially outer surface and defines a first aperture extending axially therethrough; and
   a second boss extending radially outwardly from the radially outer surface and circumferentially spaced apart from the first boss, wherein the second boss comprises a second circumferentially outer surface and defines a second aperture extending axially therethrough,
   wherein the first circumferentially outer surface of the first boss is parallel to the first circumferential surface of the component wall to form a first continuous surface and the second circumferentially outer surface of the second boss is parallel to the second circumferential surface of the component wall to form a second continuous surface;
   wherein the component is a shroud; and
   wherein the first boss or the second boss comprises a first boss portion and a second boss portion axially spaced apart from the first boss portion.

6. A gas turbine, comprising:
   a compressor;
   a combustion section;
   a turbine;
   a shaft rotatably coupling the compressor and the turbine; and
   a shroud positioned in the turbine or the compressor, the shroud comprising:
      a shroud wall comprising a radially inner surface, a radially outer surface, a first circumferential surface, and a second circumferential surface;
      a first boss extending radially outwardly from the radially outer surface, wherein the first boss comprises a first circumferentially outer surface and defines a first aperture extending axially therethrough; and
      a second boss extending radially outwardly from the radially outer surface and circumferentially spaced apart from the first boss, wherein the second boss comprises a second circumferentially outer surface and defines a second aperture extending axially therethrough,
   wherein the first circumferentially outer surface of the first boss is circumferentially aligned and parallel to the first circumferential surface of the component wall to form a first continuous surface and the second circumferentially outer surface of the second boss is circumferentially aligned and parallel to the second circumferential surface of the component wall to form a second continuous surface.

7. The gas turbine of claim 6, wherein the shroud wall, the first boss, and the second boss are constructed from a composite.

8. The gas turbine of claim 6, wherein the first circumferentially outer surface and the second circumferentially outer surface are planar.

9. The gas turbine of claim 6, wherein the shroud comprises a fillet that couples the radially outer surface to a circumferentially inner surface of the first boss or the second boss.

10. The gas turbine of claim 6, wherein the shroud further comprises a first shroud and a second shroud axially aligned with and circumferentially adjacent to the first shroud.

11. The gas turbine of claim 10, wherein the first circumferentially outer surface of the first boss of the second shroud is positioned circumferentially between the first circumferential surface of the second shroud and the second circumferential surface of the first shroud.

12. A gas turbine, comprising:
   a compressor;
   a combustion section;
   a turbine;
   a shaft rotatably coupling the compressor and the turbine; and
   a shroud positioned in the turbine or the compressor, the shroud comprising:
      a shroud wall comprising a radially inner surface, a radially outer surface, a first circumferential surface, and a second circumferential surface;

a first boss extending radially outwardly from the radially outer surface, wherein the first boss comprises a first circumferentially outer surface and defines a first aperture extending axially therethrough; and a second boss extending radially outwardly from the radially outer surface and circumferentially spaced apart from the first boss, wherein the second boss comprises a second circumferentially outer surface and defines a second aperture extending axially therethrough, wherein the first circumferentially outer surface of the first boss is parallel to the first circumferential surface of the component wall to form a first continuous surface and the second circumferentially outer surface of the second boss is parallel to the second circumferential surface of the component wall to form a second continuous surface;

wherein the shroud further comprises a first shroud and a second shroud axially aligned with and circumferentially adjacent to the first shroud;

wherein the first circumferentially outer surface of the first boss of the second shroud is positioned circumferentially between the first circumferential surface of the second shroud and the second circumferential surface of the first shroud; and wherein the first boss of the second shroud comprises a first boss portion and a second boss portion axially spaced apart from the first boss portion, and wherein the second boss of the first shroud is positioned axially between the first boss portion and the second boss portion.

13. A method for fabricating a composite component for a gas turbine, the method comprising:

laying a first plurality of composite plies in a mold, wherein a portion of the first plurality of composite plies curves radially outward;

laying a second plurality of composite plies over the first plurality of composite plies, wherein a first portion of the second plurality of composite plies contacts the first plurality of composite plies, and a second portion of the second plurality of composite plies extends past the portion of the first plurality of composite plies;

folding the second portion of the second plurality of composite plies over the first portion of the second plurality of composite plies;

curing the first plurality of composite plies and the second plurality of composite plies; and machining the first plurality of composite plies after curing.

14. The method of claim 13, further comprising:

wrapping a third plurality of composite plies around a mandrel to form an annular wall; and laying the third plurality of composite plies over the second plurality of composite plies.

15. The method of claim 13, wherein the machining step forms a pair of circumferentially opposed planar side surfaces.

16. The method of claim 13, further comprising:

inserting a composite filler structure in a cavity collectively defined by the second plurality of composite plies and the third plurality of composite plies.

* * * * *